(12) United States Patent
Goldburt et al.

(10) Patent No.: US 6,434,881 B1
(45) Date of Patent: *Aug. 20, 2002

(54) DEVICE FOR ENHANCING PHOTOSYNTHESIS

(75) Inventors: E. Tim Goldburt, Chappaqua; Albert Sicignano, Mt. Kisco; Matt Sandy, Chappaqua, all of NY (US); Peter Von Gundlach, Bisbee, AZ (US)

(73) Assignee: General Phosphorix LLC, Ardsley, NY (US)

( * ) Notice: Subject to any disclaimer, the term of this patent is extended or adjusted under 35 U.S.C. 154(b) by 55 days.

This patent is subject to a terminal disclaimer.

(21) Appl. No.: 09/696,753

(22) Filed: Oct. 26, 2000

Related U.S. Application Data

(63) Continuation-in-part of application No. 09/064,265, filed on Apr. 22, 1998, now Pat. No. 6,158,169.

(51) Int. Cl.[7] .................................................. A01G 9/00
(52) U.S. Cl. .......................................................... 47/17
(58) Field of Search ............................. 47/17; 523/135; 524/82

(56) References Cited

U.S. PATENT DOCUMENTS

| | | | | |
|---|---|---|---|---|
| 4,895,904 A | * | 1/1990 | Allingham | 523/135 |
| 5,710,197 A | * | 1/1998 | Fischer et al. | 524/82 |
| 5,813,169 A | * | 9/1998 | Engerman | 47/17 |
| 6,158,169 A | * | 12/2000 | Goldburt et al. | 47/17 |

* cited by examiner

*Primary Examiner*—Charles T. Jordan
*Assistant Examiner*—Francis T. Palo
(74) *Attorney, Agent, or Firm*—I. Zborovsky

(57) ABSTRACT

A device for enhancing photosynthesis has a membrane which is formed so that the membrane covers plants or vegetables, the membrane having photo-transforming qualities which convert UV light for plants and vegetables into growth-enhancing light that promotes photosynthesis.

7 Claims, 1 Drawing Sheet

DEVICE FOR ENHANCING PHOTOSYNTHESIS

CROSS REFERENCE TO A RELATED APPLICATION

This application is a continuation-in-part of patent application Ser. No. 09/064,265 filed on Apr. 22, 1999, now U.S. Pat. No. 6,158,169.

BACKGROUND OF THE INVENTION

The present invention relates generally to agriculture and more particularly to a device for enhancing photosynthesis.

Recently many public broadcasts have alarmed consumers about contaminated vegetables and fruits imported from countries which do not have to comply with food content and contamination standards of the United States. This produce has let to localized outbreaks of food poisonings, particularly among great school students. It is therefore desirable to address this issue. Also, it is believed to be desirable to enhance and accelerate plant growth and yield.

SUMMARY OF THE INVENTION

Accordingly, it is an object of present invention to provide a device for enhancing photosynthesis which accelerates plant growth and yield.

In keeping with these objects and with others which will become apparent hereinafter, one feature of present invention resides, briefly stated, in a device for enhancing photosynthesis which has a membrane such that said membrane covers plants or vegetables, said membrane having photo-transforming qualities which convert UV light for plants and vegetables into growth-enhancing light that promotes photosynthesis.

When the device is designed in accordance with the present invention it provides the above mentioned advantages.

When the membrane of the device is utilized, it extends a growing season, accelerates a riping period, increasing a cup yield, increases a frost protection, increases growing temperature, reduces crop sunburn, increases essential vitamins in fruits and vegetables, reduces vulnerability to ultraviolet radiation and therefore a resulting degradation.

The membrane can be designed so that it has all above mentioned properties or only some of them. It extends the growing season and accelerates the riping period by up to three weeks, increases the crop yield up to 50%, provides frost protection down to 18° F., etc.

In accordance with a further feature of present invention, the membrane includes a photo-transforming additive that enhances photosynthesis by increasing conversion of a UV light spectrum. The photo-transforming additive can have a particle range from 50A to 50M$\mu$.

In accordance with still a further feature of the present invention, the membrane has a luminescent additive providing its illumination at nighttime.

The membrane in accordance with the present invention can be arranged on a frame so as to form a structure which covers the plants. On the other hand, ill can be formed as a freely-lying membrane which can be placed over plants.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
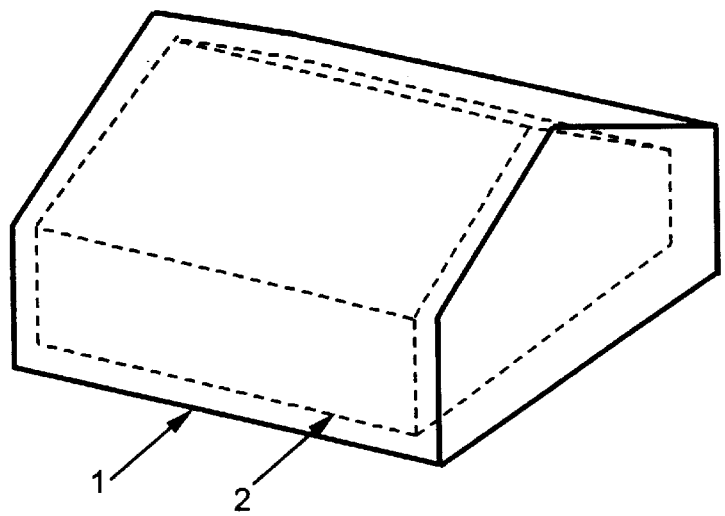
FIG. 1 is a perspective view of a device for enhancing photosynthesis in accordance with one embodiment of present invention.
Figure 2:
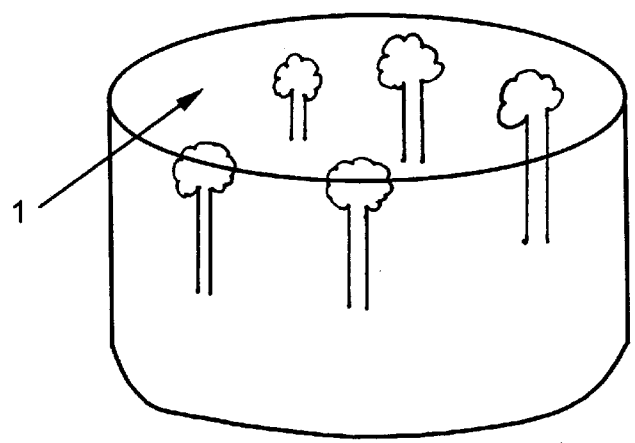
FIG. 2 is a view showing the inventive device for enhancing photosynthesis in accordance with another embodiment of the invention.

As shown in FIG. 1, a device for enhancing photosynthesis has a membrane which is identified with reference numeral 1. The membrane 1 in accordance with one embodiment can be arranged on a frame which is identified with reference numeral 2 as shown in FIG. 1. FIG. 2 shows another embodiment of present invention, in which the device consists exclusively of the membrane 1 without a frame. The device including the membrane 1 and the frame 2 can be erected so as to cover corresponding plants, while the device which includes the membrane 1 only can be also stretched over the corresponding plants.

The membrane 1 contains a photo-transforming additive that enhances photosynthesis by increasing conversion of the UV light spectrum. A luminescent additive can be also included in the membrane to provide a higher illumination level at nighttime. The membrane can be made of 6–10 mil polyethylene plastic.

Figure 3:
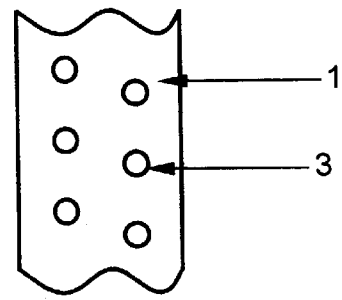
FIG. 3 shows a cross-section of a membrane of the inventive device.

As shown in FIG. 3, the membrane has particles 3 of photo-transforming additive which is dispersed in it. The particle size 3 of the additive can vary, from 50A to 50 $\mu$A. The partial size distribution of the photo-transforming additive can be wide or narrow.

The photo-transforming additive whose particles are dispersed in a membrane can be, for example a luminescent material with a formula $Y_2O_2S:E_u$ as disclosed in our patent application Ser. No. 09/178,542.

The membrane which is made in accordance with the present invention provides one. or several, or all of the following results. It can extend a growing season, accelerate a ripening period, increase a crop yield, increase a frost protection, increase a growing temperature, reduce crop sunburns, increase essential vitamins in fruits and vegetables, reduce vulnerability to ultraviolet radiation and therefore resulting degradation.

It will be understood that each of the elements described above, or two or more together, may also find a useful application in other types of constructions differing from the types described above.

While the invention has been illustrated and described as embodied in device for enhancing photosynthesis, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for enhancing photosynthesis comprising a membrane which is formed so that said membrane covers plants or vegetables, said membrane having photo-transforming qualities which convert UV light for plants and vegetables into growth-enhancing light that promotes photosynthesis.

2. A device as defined in claim 1, wherein said membrane is formed so that it provides at least one property selected from the group consisting of extending a growing season, accelerating a ripening period, increasing a crop yield, increasing a frost protection, increasing growing temperature, reducing crop sunburns, increasing essential vitamins in fruit and vegetables, reducing vulnerability to ultraviolet radiation and therefore a resulting degradation.

3. A device as defined in claim 2, wherein said membrane includes a photo-transforming additive that enhances photosynthesis by increasing conversion of a UV light spectrum.

4. A device as defined in claim 1, wherein said membrane has a luminescent additive providing its illumination at nighttime.

5. A device as defined in claim 1; and further comprising a frame which supports said membrane, said frame having a luminescent additive providing its illumination at nighttime.

6. A device as defined in claim 1, Wherein said membrane has a photo-transforming additive with a particle range from 50 A to 50 µm.

7. A device as defined in claim 1, wherein said frame together with said membrane has an air foil design with valved panels having reduced wind resistance.

* * * * *